W. McKENNITT.
THRUST BEARING FOR POWER SHAFTS.
APPLICATION FILED APR. 29, 1918.
1,309,763.
Patented July 15, 1919.
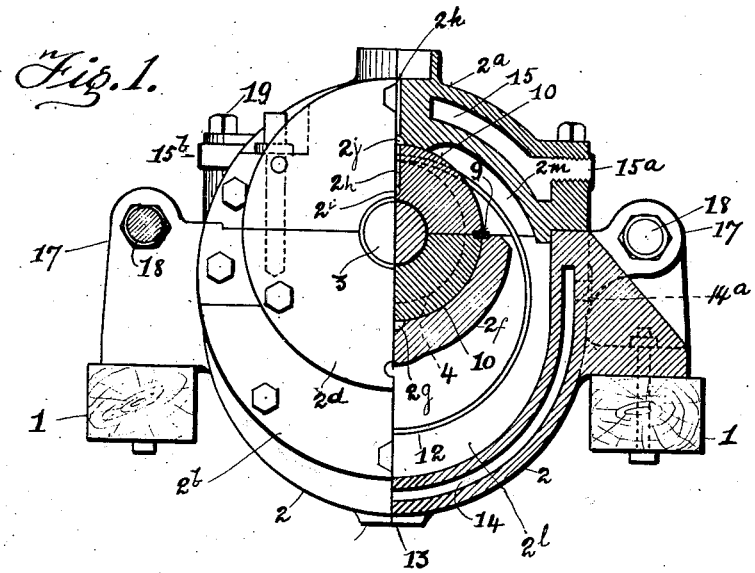
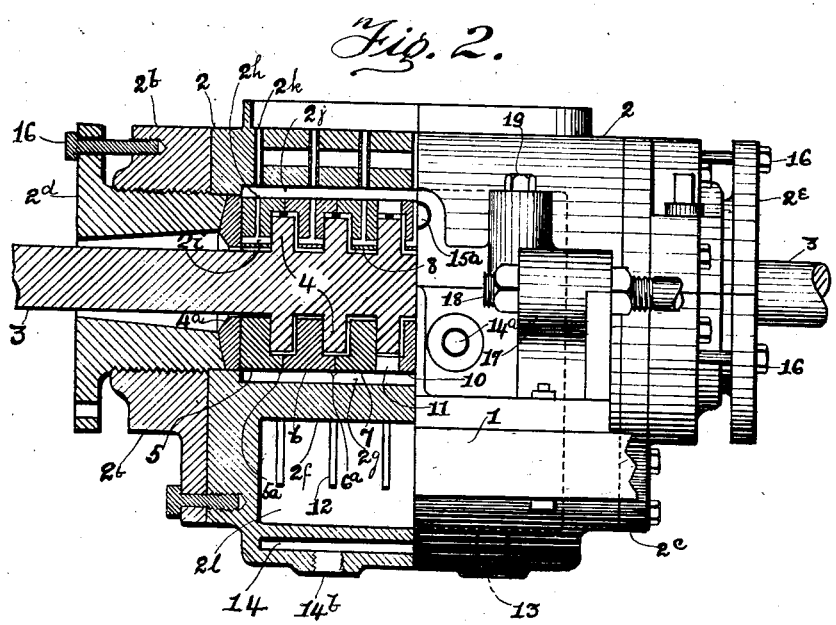
WITNESSES:
A. M. Lovelace
M. E. Stauffacher
INVENTOR.
William McKennitt
BY James T. Watson
ATTORNEYS.

UNITED STATES PATENT OFFICE.

WILLIAM McKENNITT, OF LAKEWOOD, MINNESOTA.

THRUST-BEARING FOR POWER-SHAFTS.

1,309,763. Specification of Letters Patent. Patented July 15, 1919.

Application filed April 29, 1918. Serial No. 231,501.

*To all whom it may concern:*

Be it known that I, WILLIAM McKENNITT, a citizen of the United States, residing at Lakewood, in the county of St. Louis and State of Minnesota, have invented certain new and useful Improvements in Thrust-Bearings for Power-Shafts, of which I do hereby declare the following to be a specification.

My invention relates to thrust bearings for power shafts and has for its object the provision of a plurality of adjustable thrust bearings which may all be adjusted by one operation. Heretofore it has been common practice to employ a series of so-called horseshoe bearing collars mounted on threaded rods extending parallel to the shaft and separately adjusted thereon by means of adjusting nuts engaging said rods, said bearing collars extending over the power shaft and between collars turned on the shaft. The separate adjustment from time to time of said horseshoe collars required much time and labor, which it is one of the objects of my invention to reduce. With this and other objects in view, my invention consists of the structures, combinations and arrangements of parts hereinafter described and claimed.

In the drawings, Figure 1, is an end elevation of my invention partly in central vertical transverse section. Fig. 2 is a side elevation of said invention, partly in central vertical longitudinal section.

In the drawings 1, 1, are base sills of any suitable structure, upon which is mounted a housing comprising a body portion 2 of approximately semi-cylindrical shape, secured to said sills; a cover or cap member $2^a$; end plates $2^b$ and $2^c$, and take-up glands $2^d$ and $2^e$ mounted in said end plates respectively. A power shaft 3 extends longitudinally through said housing preferably in the plane of division between said body portion and cap, said shaft extending through said glands concentric therewith. Said shaft has formed thereon or secured thereto a plurality of flanges or collars 4, spaced from each other and adapted to turn with said shaft. Preferably, a slidable non-rotatable transversely divided equalizing collar $4^a$ also surrounds said shaft within said housing and adjacent to each of said glands; said equalizing collar being shown in the drawing only in the sectioned portion of Fig. 2, an oppositely disposed similar collar being, however, positioned adjacent to the gland $2^e$. Extending into the spaces between said equalizing collar and the opposing shaft collar, and between the respective shaft collars, are slidable non-rotatable transversely divided thrust bearings or collars as 5, 6, 7, adapted to approximately fill such spaces. Said thrust collars are of greater diameter than said shaft collars and extend beyond the radius or plane of rotation thereof and space fillers of any suitable structure as $5^a$ $6^a$ are provided to fill the spaces between such bearing collars beyond the plane of rotation of said shaft collars, which fillers may if desired consist of flanges formed on said bearing collars and adapted to extend across said shaft collars whereby said slidable thrust collars are adapted to bear against each other. The lower halves of said slidable collars are adapted to rest upon a diaphragm or cradle $2^f$ formed in said body portion, which diaphragm preferably has formed in its upper face adjacent to the bottoms of said slidable collars, an oil channel $2^g$. Oil wells $2^h$ extend through the upper halves of said slidable collars, which wells preferably communicate at one end with corresponding oil grooves $2^i$ preferably formed in the axial faces of the upper halves of said slidable collars; said oil wells communicating at their opposite or outer ends with a longitudinal oil groove $2^j$ formed in the inner face of said cap, which latter channel communicates with one or more oil ports $2^k$ extending through said cap. Thus oil may be introduced if desired through said ports $2^k$ and flow into the groove $2^j$, thence into the several wells $2^h$, thence into the grooves $2^i$. Babbitt metal or other suitable bushing 8 is preferably interposed between said slidable collars and said shaft. To prevent said slidable collars from turning with said shaft, I provide keys as 8 therefor, said keys engaging said diaphragm and said slidable collars, which keys by preventing the turning of the upper halves of the collars indirectly also prevent the turning of the lower halves thereof. Said slidable collars of any suitable number, as 5, 6, and 7, at one end of said housing may be regarded as the bearings opposing the reverse thrust of the shaft. It is not believed to be necessary to show the similar but oppositely disposed slidable collars in the other end of said housing for opposing the advance thrust of said shaft, which latter collars may be of the same or any suitable number, but are preferably of greater number than those for opposing the reverse thrust, since the advance thrust is usually of greater duration and of greater pressure. A portion of one of the slidable collars for opposing the advance thrust is, however, shown, as at 10, particularly for the purpose of further showing that the slidable collars for opposing the advance thrust and those for opposing the reverse thrust do not bear against each other, but are separated by an annular clearance space 11 surrounding one of said shaft collars. It will be observed that in order to adjust the slidable reverse thrust collars, the gland $2^d$ is advanced or retracted, and in order to adjust the stationary advance thrust collars, the gland $2^e$ is advanced or retracted, the advance of said glands toward the center of the housing operating to push or slide the correspondingly adjacent equalizing collars against the correspondingly adjacent series of slidable thrust collars and to force said slidable collars into contact with said shaft collars.

Below the diaphragm or cradle in said body portion is formed an oil reservoir or chamber $2^l$ which extends upward at each side of said diaphragm and communicates with a space $2^m$ in said cap. Disposed eccentrically to said diaphragm and space fillers and surrounding the same and extending between said space fillers or shaft collar flanges and said stationary collars—said fillers being grooved or apertured to admit them—are a series of oiling rings 12 adapted to dip into the oil in said reservoir and to turn on their own axes under frictional drive by said shaft to lift oil into the spaces between the perimeters of the shaft collars and the surrounding fillers or flanges of the stationary collars whence the oil may spread over the perimeters of the shaft collars and run down the sides of said shaft collars and between the bushing and the shaft. Said reservoir may be filled or drained through any suitable port or ports provided for the purpose, as through a port 13, shown in broken lines in Fig. 2. In the outer walls of said body portion and cap, I preferably form water circulation spaces, 14 and 15, respectively, for cooling the oil and interior chambers, for which spaces, respectively, any suitable water inlet ports may be provided as $14^a$, $15^a$ and for which spaces any suitable exhaust ports may be provided, as $14^b$, $15^b$, respectively. Said take-up glands may be secured by being screwed into said end plates, or, if desired, especially in the case of heavier structure and strains, may be slipped into a smooth bore (not shown) in said end plates and bolted up to shims (not shown) by means of any suitable number of bolts as 16, as will be well understood by those skilled in the art. Said body portion preferably has apertured ears 17 formed thereon adapted to engage tie rods 18 extending longitudinally or divergently to any suitable stationary anchorage, as to the frames of a ship (not shown) to which they may be secured to further secure said body portion in position. Said cap may be secured to said body portion in any suitable manner or by any suitable means, as by bolts 19. Said end plates and glands are also horizontally divided and the purpose of dividing them and of dividing said housing and equalizing and slidable collars is so that they can be placed in position or removed after the shaft is in position, thus facilitating repairs or renewals. It is obvious that the structure embodying my invention may be altered or modified or supplemented in various particulars and minor details without departing from the spirit and scope of certain of my claims.

Having described my invention, what I claim is—

1. The combination with a rotatable power shaft having a collar formed thereon or secured thereto, of a slidable bearing collar encircling said shaft adjacent to one side of said shaft collar, means for preventing the rotation of said slidable bearing, a normally stationary support, and adjusting means partly engaging said support, said adjusting means encircling said shaft and being adapted to push said bearing collar into contact with the opposing side of said shaft collar.

2. The combination with a rotatable power shaft having two collars spaced from each other formed thereon or secured thereto, a slidable bearing member adjacent to the outer side of one of said shaft collars, a slidable bearing member extending into the space between said shaft collars, said slidable members extending beyond the radius of said shaft collars, means for filling the space between said slidable members at a point beyond the radius of said shaft collars, a normally stationary support, and adjusting means partly engaging said support for sliding said slidable bearing members, said adjusting means being adapted to bear against the exposed face of the first said one of said slidable members and to push said member longitudinally of said shaft into contact with the opposing face of said one of said shaft collars and to cause said first slidable member and said filling means to push the second slidable member into contact with the opposing side face of the other of said shaft collars.

3. The combination with a rotatable power shaft having two collars spaced from each other formed thereon or secured thereto, a slidable transversely divided bearing collar encircling said shaft adjacent to the outer face of one of said shaft collars, a slidable transversely divided bearing collar encircling said shaft and extending into the space between said shaft collars, said bearing collars being of greater diameter than said shaft collars, means for filling the space between said bearing collars beyond the plane of rotation of said shaft collars, means for supporting said bearing collars and filling means, and adjusting means encircling said shaft, said adjusting means being adapted to bear against the exposed side face of the first said one of said slidable collars and to push said slidable collar longitudinally of said shaft into contact with the opposing side face of the adjacent one of said shaft collars and to cause said first slidable collar and said filling means to thrust the second said slidable collar into contact with the opposing side face of the other one of said shaft collars.

4. The combination of a housing comprising a body portion, a cover, or cap portion, an end plate at each end of said body and cap portion, and take-up glands in each of said end plates; a power shaft extending through said glands, the portion of said shaft within said housing having a plurality of collars spaced from each other formed thereon or secured thereto, two series of slidable bearing collars encircling said shaft within said housing, the units of each of said series being transversely divided, each of said units being adjacent to the side of a corresponding one of said shaft collars, said units being of greater diameter than said shaft collars, said two series being spaced from each other, means positioned beyond the plane of rotation of said shaft collars, for filling the spaces between the units of each of said series respectively, means supporting said units, adjusting means including one of said glands for thrusting one series of said bearing collars and fillers in one direction to cause each of the collars of said one of said series to contact with the shaft collar respectively adjacent in such direction, and adjusting means including the other of said glands for thrusting the other one of said series of said bearing collars and fillers in the opposite direction to cause each of the collars of said other series to contact with the shaft collar respectively adjacent in such direction.

5. The combination of a housing comprising a body portion, a cover or cap portion, end plates and a take-up gland in each of said end plates, said housing being adapted to contain a pool of oil in its lower portion; a power shaft extending through said glands, said power shaft having a plurality of collars spaced from each other formed thereon or secured thereto, two series of slidable bearing collars encircling said shaft within said housing, the units of each of said series being transversely divided, each of said units being adjacent to the side of a corresponding one of said shaft collars, said units being of greater diameter than said shaft collars, said two series being spaced from each other, means positioned beyond the plane of rotation of said shaft collars for filling the spaces between the units of each of said series respectively, means for supporting said units and fillers, means for preventing the rotation of said units and fillers, said fillers having passages formed therein for the passage of oiling rings, oiling rings extending between said fillers and the peripheries of said shaft collars and extending approximately to the bottom of said housing, adjusting means including one of said glands adapted to thrust one series of said collars and fillers in one direction to cause each of the collars of said one of said series to contact with the shaft collar respectively adjacent in such direction, adjusting means including the other of said glands adapted to thrust the other of said series in the opposite direction to cause each of the collars of such other series to contact with the shaft collar respectively adjacent in such direction.

6. The combination of a housing comprising a body portion, a removable cover or cap portion, a transversely divided end plate at each end and transversely divided take-up glands positioned in said end plates; a power shaft extending through both of said glands, said shaft having a plurality of collars formed thereon or secured thereto, two series of slidable bearing collars encircling said shaft, means for supporting said bearing collars, adjustable means including one of said glands adapted to thrust one of said series in one direction to cause each of the collars in said series to contact with a respectively opposing one of said shaft collars in such direction, adjustable means including the other of said glands adapted to thrust the other of said two series in the opposite direction to cause each of the collars of such other series to contact with a respectively opposing one of said shaft collars in such direction.

7. The combination of a housing comprising a body portion, a removable cap portion, end plates and take-up glands in said end plates; a power shaft extending through said glands, said shaft having a plurality of collars spaced from each other formed thereon or secured thereto, two series of slidable transversely divided bearing collars encircling said shaft, means for supporting said bearing collars, means for preventing the rotation of said bearing collars, the interior face of said cap being longitudinally grooved above said bearing collars, said cap having an oil port or ports extending therethrough from said groove, each of said bearing collars having a radially directed passage formed therein extending from its axial face to its periphery and adapted to communicate with said groove, adjusting means including one of said glands for moving one series of said bearing collars in one direction longitudinally of said shaft, and adjusting means including the other of said glands for moving the other said series of bearing collars in the opposite direction longitudinally of said shaft, each of said bearing collars being adapted to contact with the side of a respectively adjacent one of said shaft collars.

In testimony whereof I hereunto affix my signature, in presence of two witnesses.

WILLIAM McKENNITT.

Witnesses:
G. A. E. FINLAYSON,
W. A. WATTS.